United States Patent [19]

Ide

[11] 4,036,376

[45] July 19, 1977

[54] CARGO TRANSPORT SYSTEM

[76] Inventor: Allan R. Ide, 10066 Bloomfield, Cypress, Calif. 90630

[21] Appl. No.: 675,198

[22] Filed: Apr. 8, 1976

[51] Int. Cl.² .............................................. B65G 67/58
[52] U.S. Cl. ..................................... 214/14; 198/470; 198/730
[58] Field of Search ............... 198/469, 470, 796, 730; 214/12, 13, 14, 15 R, 15 D

[56] References Cited

U.S. PATENT DOCUMENTS

| | | | |
|---|---|---|---|
| 2,758,703 | 8/1956 | Hampf | 214/14 X |
| 3,520,396 | 7/1970 | Lingg | 214/14 X |
| 3,993,200 | 11/1976 | Ide | 198/470 X |

FOREIGN PATENT DOCUMENTS

| | | | |
|---|---|---|---|
| 769,027 | 6/1934 | France | 214/14 |
| 406,100 | 7/1966 | Switzerland | 198/469 |

*Primary Examiner*—Frank E. Werner
*Attorney, Agent, or Firm*—Fulwider, Patton, Rieber, Lee & Utecht

[57] ABSTRACT

A cargo transport system is provided for a vessel in which a transfer mechanism separately transfers discrete cargo loads from a loading station on the deck of the vessel to a vertically extending conveyor system. A powered cargo delivery system sequentially forces cargo loads from the loading station onto the transfer mechanism. A sensing device detects the approach of a receptacle of the vertically extending conveyor system and actuates the transfer mechanism to transport one load from the loading station to the approaching receptacle. The sensing device also actuates the cargo delivery system to force the following cargo load onto the transfer mechanism after the elapse of a pre-set interval during which time the transfer mechanism transfers a load to a receptacle and returns to a load acceptance position. The cargo delivery means is preferably formed of sprockets turning an endless chain to which are fastened push bars. The push bars extend perpendicular to the plane in which the chain moves and push the cargo loads across a loading platform at the loading station and onto the transfer mechanism.

16 Claims, 7 Drawing Figures

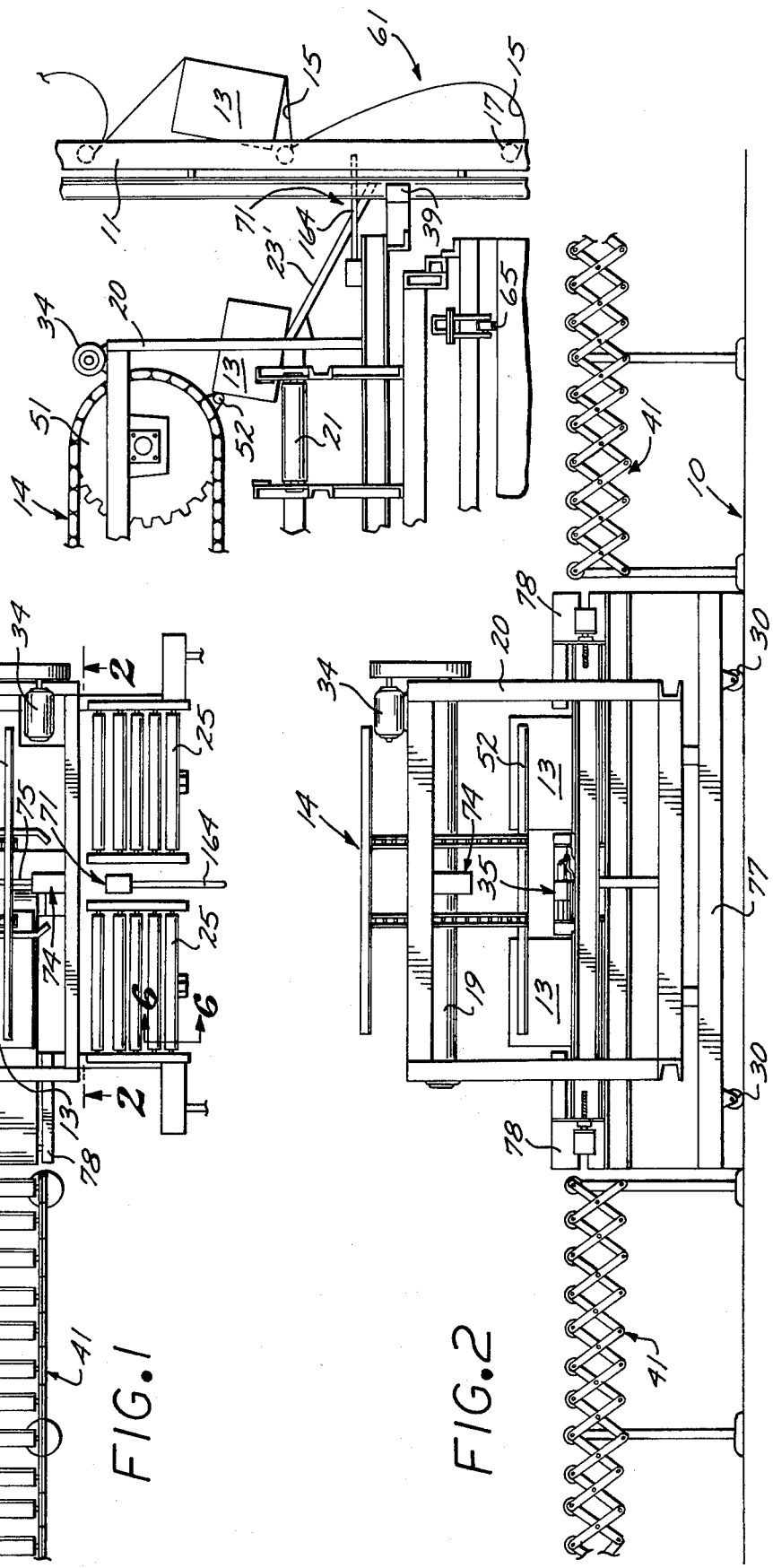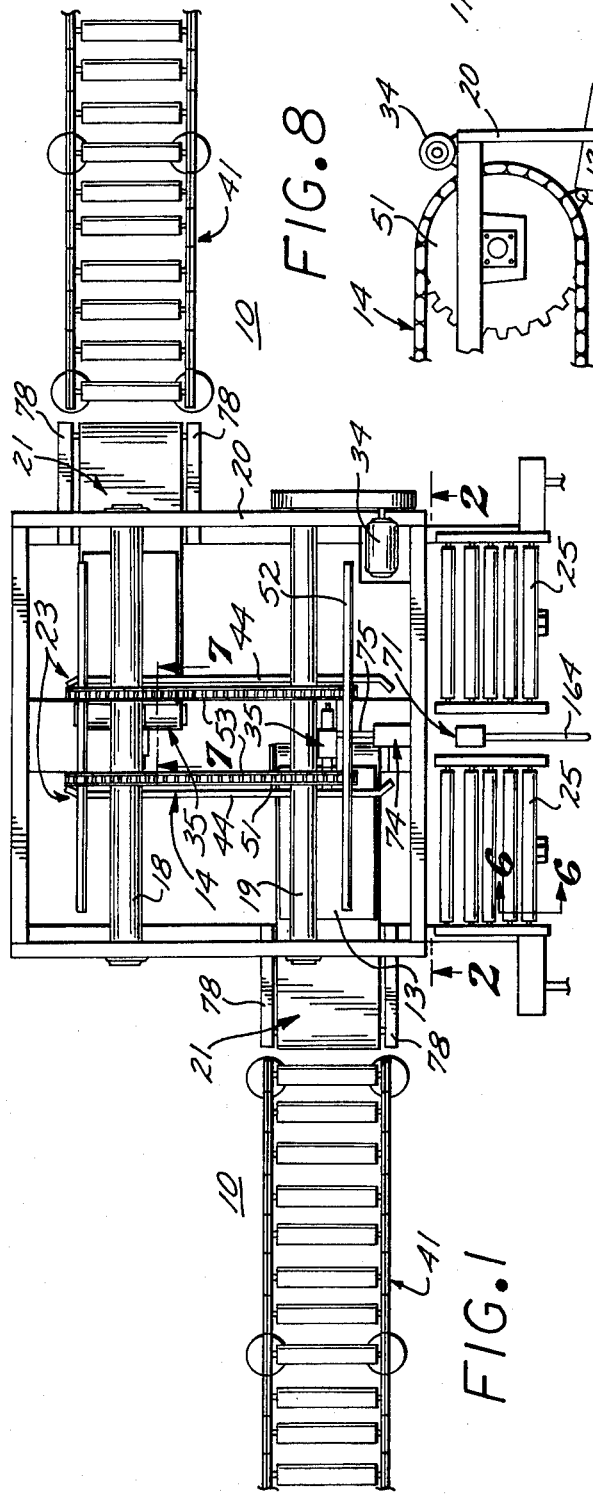

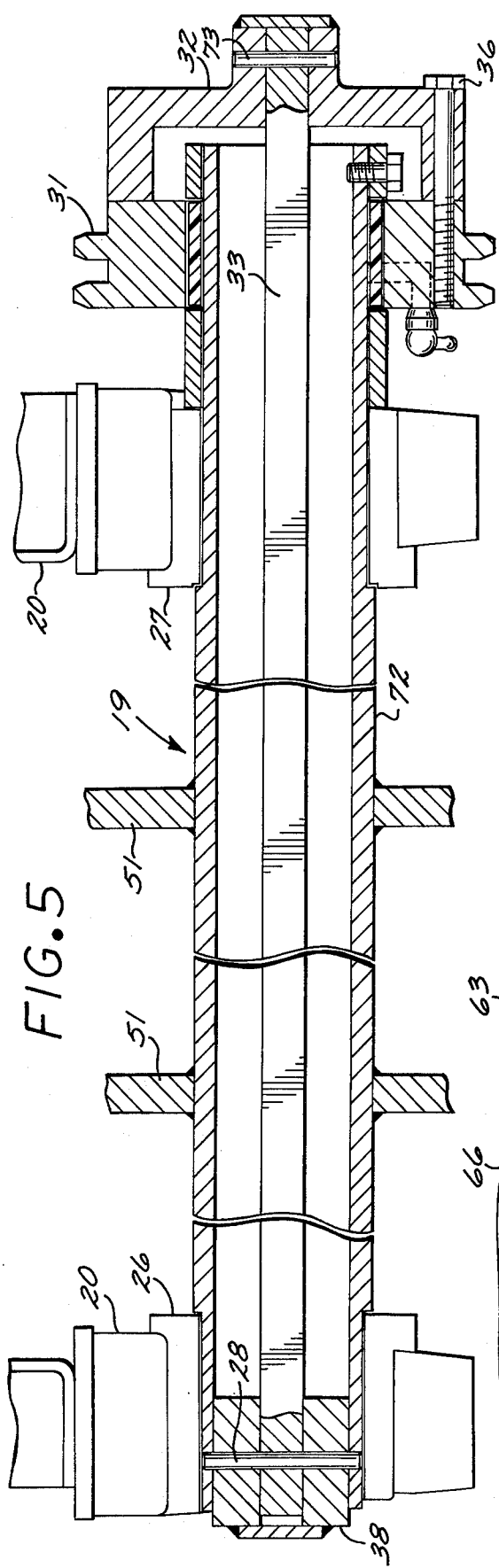
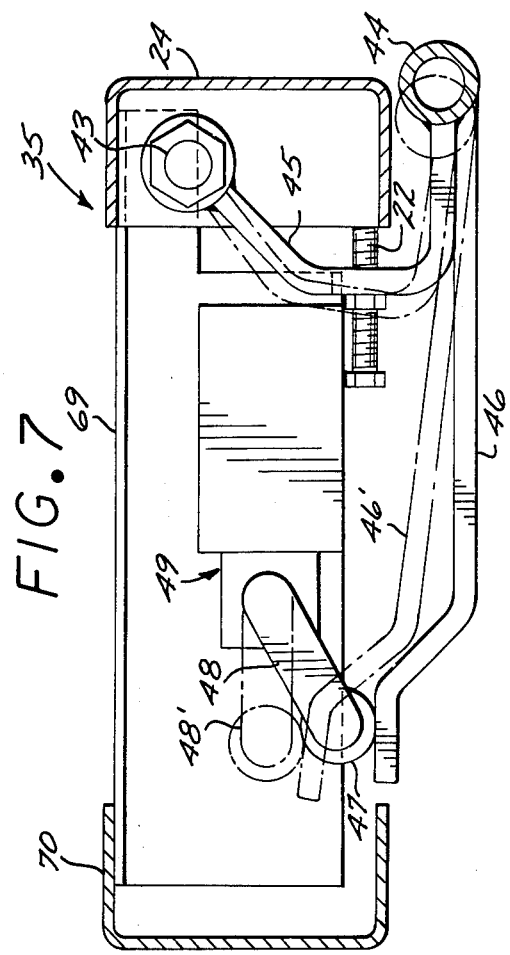
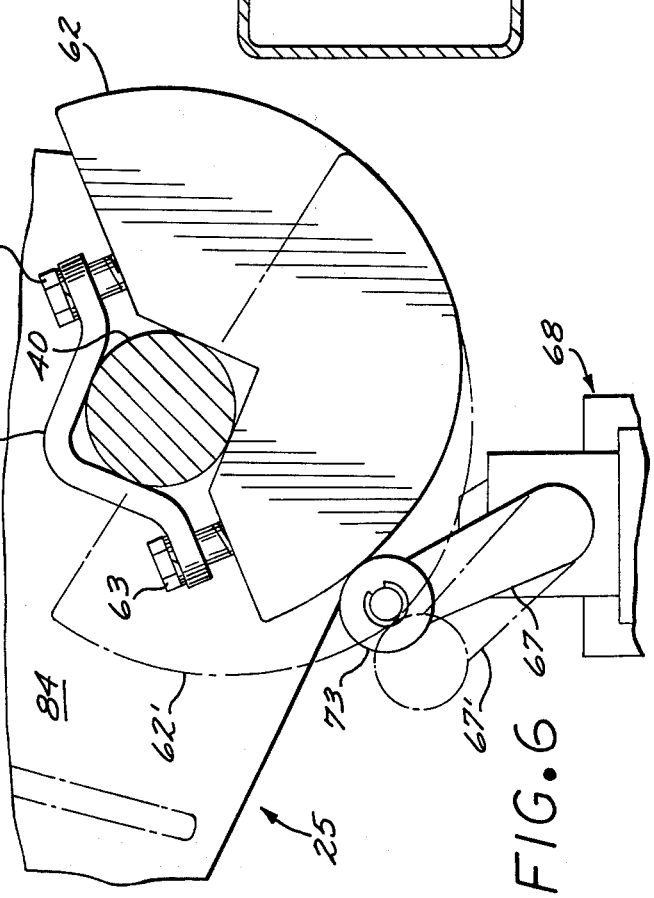

CARGO TRANSPORT SYSTEM

BACKGROUND OF THE INVENTION

In loading and unloading cargo packed in individual, discrete units from the hold of a ship, it is common practice to mount a vertically extending conveyor on a loading dock. A conventional cargo transport system also includes a lateral conveyor upon the deck of a vessel which directs movement of discrete cargo loads along a path terminating at a loading station on the vessel. The cargo loads may then be transferred to the vertically extending conveyor. The vertical conveyor tower includes an endless conveyor means formed with discrete receptacles traversing the length of the tower, so that each of the receptacles sequentially approaches the loading station to receive a cargo load.

The prior art systems have heretofor involved certain problems however. For example, in the aforementioned United States patent application, the powered lateral conveyor system includes a powered conveyor means at the loading station. Load checking means are provided in that system to prevent additional loads from approaching the transfer mechanism and from approaching the loading station when the transfer mechanism is actuated and unable to accept additional loads. While this feature was designed to prevent cargo boxes from piling up at the transfer mechanism, a problem results because after transfer of a load to the vertical conveyor system, the inertia of the following boxes must be overcome for loading of the subsequent boxes to proceed. By providing a powered conveyor means at the loading station with a checking means to prevent the advance of cargo loads during the periods of time when the transfer mechanism is unavailable to accept such loads, an irregular, jerking motion is introduced into the train of cargo loads being transferred to the vertical conveyor system. Because of this "inch-worm" effect, advancement of cargo loads for off loading is held up by the load checking devices in the conventional lateral conveyor systems. Thus, the time required to unload a vessel is increased.

SUMMARY OF THE INVENTION

Accordingly, it is the object of the present invention to eliminate the disjointed movement in a string of individual and discrete cargo loads to be transferred from a vessel to a vertical tower extending from a dock. The elimination of the requirement to bring each unit of cargo to the transfer mechanism from a stationary position reduces the time required to unload a vessel.

A related object of the invention is to synchronize the advancement of discrete cargo leads proceeding in seriatim order toward a loading station with the transfer of cargo loads from the loading station to a vertically extending conveyor system. In this way a series of loads is transferred to the vertical conveyor system in a smooth flow, rather than in a halting staccato fashion. As previously noted, advancement of the load in this manner increases the rapidity with which the vessel may be unloaded.

In a broad aspect, the invention may be considered to be an improved cargo transport system for use in transferring a multiplicity of separate and discrete loads to a cargo terminal from a loading area of a vessel vertically displaced therefrom, comprising: a vertically extending support secured to said cargo terminal and having an endless conveyor system with separate receptacles therein traveling the length thereof, whereby each of the receptacles approaches the loading area of the vessel along a generally vertical path in seriatim order; a powered lateral conveyor means mounted on said vessel to carry said discrete loads along a horizontal path to said loading area; a queing platform located at said loading area for receiving loads from said lateral conveyor means; a load transfer mechanism cyclically operable to switch from a load acceptance mode to a load transfer mode and to return to said load acceptance mode for individually accepting said separate loads from queing platform while in a load acceptance mode and for individually transferring said loads to the receptacles during operation in said load transfer mode to effectuate transpositioning of said separate loads between the generally horizontal path and the generally vertical path; powered cargo delivery means for propelling the cargo loads individually across the platform to the load transfer mechanism; and receptacle sensing means for detecting the approach of a receptacle toward the loading area of the vessel and connected to switch said load transfer mechanism from said load acceptance mode to said load transfer mode to transfer a load deposited thereon to the approaching receptacle; and means for actuating the powered cargo delivery means to move another load from the queing platform onto the load transfer mechanism upon return of the load transfer mechanism to the load acceptance mode.

BRIEF DESCRIPTION OF THE DRAWINGS

FIG. 1 is a plan view of the lateral conveyor system and queing platform of the present invention;

FIG. 2 is an elevational view taken along the lines 2—2 of FIG. 1;

FIG. 5 is a sectional view taken along the lines 5—5 of FIG. 3;

FIG. 6 is a sectional view taken along the lines of 6—6 of FIG. 1;

FIG. 7 is a sectional elevational view taken along the lines 7—7 of FIG. 1;

FIG. 8 is an alternative embodiment of the invention.

DETAILED DESCRIPTION OF THE INVENTION

Figure 3:
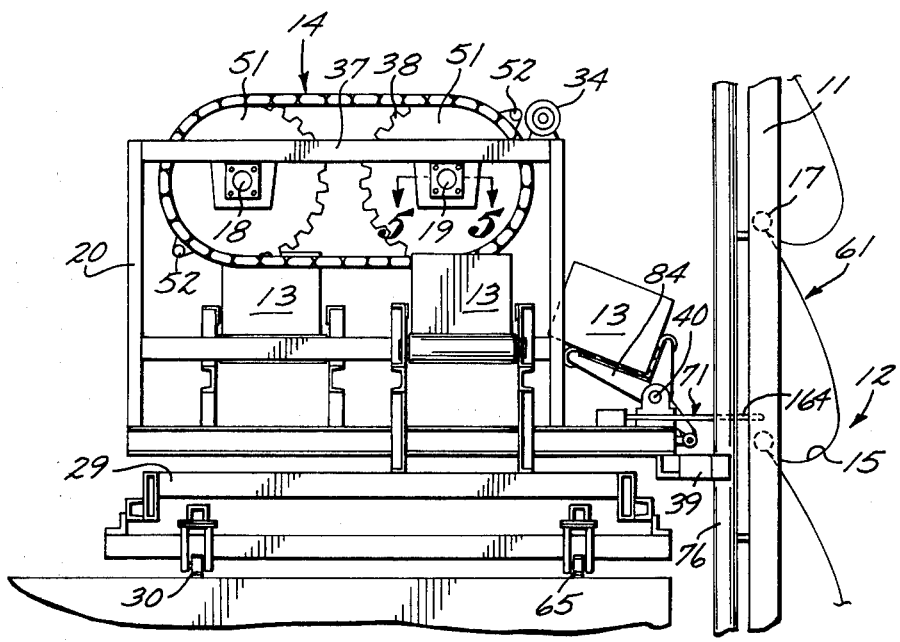
FIG. 3 is a side elevational view of the invention illustrating the load transfer mechanism in the load acceptance mode.
Figure 4:
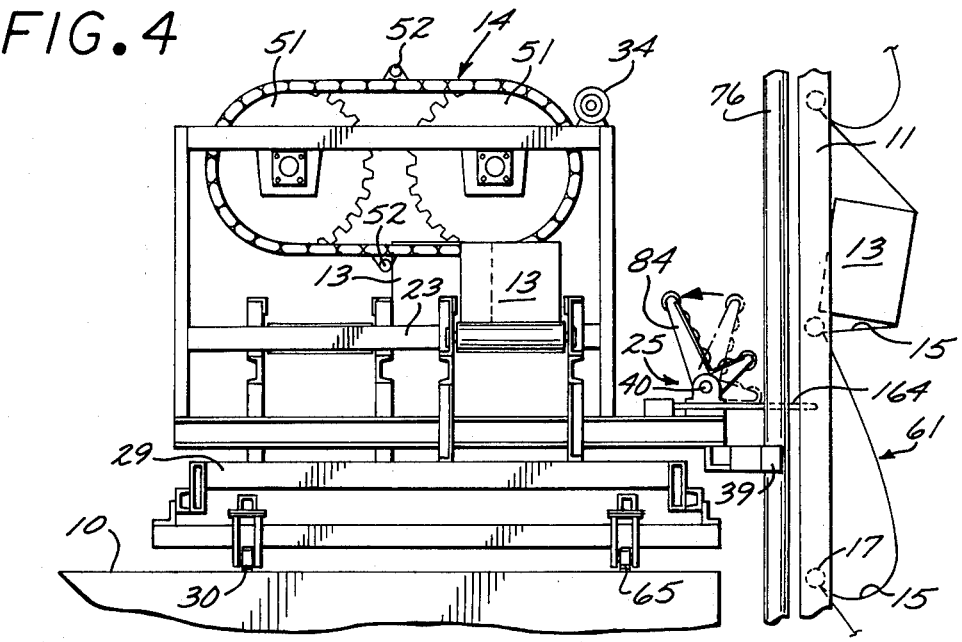
FIG. 4 is a side elevational view of the invention illustrating the invention with the load transfer mechanism returning from the load transfer mode.

Referring now to the drawing, FIG. 1 looks down upon the deck of a vessel 10 which is moored adjacent to a cargo terminal. Since the deck of the vessel 10 is vertically displaced from the cargo terminal, a vertically extending support 12 is required and extends from the cargo terminal to at least the level of the deck of the vessel 10 as illustrated in FIG. 3 and FIG. 4. The vertically extending conveyor tower 12 has upright stanchions 11 that include guide rails 76. An endless conveyor means 61 of flexible construction and preferably formed of a very heavy fabric, travels between the upright stanchions 11 of the vertically extending conveyor tower 12. The endless conveyor 61 also includes a plurality of rigid bars 17 that extend between the stanchions 11 and are constrained to move lengthwise with respect to stanchions 11 by virtue of parallel chains (not visible) which interconnect the bars 17 and limit the maximum separation between the bars 17. The fabric of the endless conveyors is looped around and secured to each of the bars 17. Sufficient fabric is provided between the bars 17 so that pockets or receptacles 15 are formed in the folds of the fabric between each pair of sequential bars 17. Receptacles 15 and bars 17 are constrained by the tower 12 to travel in a path traversing the length of tower 12. Each of the receptacles 15 sequentially approaches the loading area of the vessel 10 to receive a cargo load 13 therefrom.

On the deck of the vessel 10 powered lateral conveyors 21 are positioned for directing movement of the discrete and separate cargo loads 13 along a path on the deck of the vessel to a lateral platform 23 which serves as a loading station at which the cargo loads 13 are formed into a que line for delivery to the receptacles 15 of the vertical conveyor 61. The loading platform or station 23 is not powered, but passively receives discrete cargo load 13 delivered to it from the powered lateral conveyors 21. Limit switches 35 at the platform 23 limit the extent of travel of the loads 13 in a lateral direction as they are received from the powered conveyors 21. The lateral path in which the loads 13 are propelled by the powered conveyors 21 intersects the direction in which the loads 13 are to be moved toward the conveyor tower 12 across the platform 23. That is as the loads 13 approach the loading platform 23 from the left and right in FIG. 1, their movement is halted by the limit switches 35, which additionally provide enabling signals as will hereinafter be described. Thereafter, the loads 13 on the loading platform 23 are propelled across the platform 23 toward the bottom of FIG. 1 by the powered cargo delivery means 14, hereinafter to be described.

The powered cargo delivery means 14 is comprised of at least one flat circular member or disc 51 mounted for rotation upon the platform 23 in a plane generally perpendicular to the platform 23 and parallel to the lateral path of motion that radially intersects the generally vertical path of the vertical conveyor 61. In the embodiment depicted, the discs 51 are sprockets. Two mutually parallel pairs of sprockets 51 are provided. Each pair of sprockets 51 is linked together by a endless chain 53. A sprocket in each pair of sprockets is mounted for rotation about one of the axles 18 and 19. The axles 18 and 19 are supported on a superstructure 20 mounted upon the loading platform 23. A motor 34 and a V-belt connected to a pulley 31 forms a motor assembly for driving the pair of sprockets 51 which are mounted on the axle 19. This pair of sprockets linked together on the axle 19 may be considered to be the driving pair, while the sprockets 51 mounted on the axle 18 are the driven pair of sprockets. The driving sprockets 51 are secured to a common hollow shaft 72 proximate to the center thereof. The hollow shaft 72 forms the outer portion of axle 19 and is carried in bearings 26 and 27 of the superstructure 20. Similarly, the driven sprockets 51 are likewise mounted on the driven axle 18 which is likewise carried in bearings, but need not be hollow. modes A torsion bar 33 extends longitudinally through the shaft 72 and is connected thereto at end 38 by a locking pin 28. Proximate to the opposing end of shaft 72 the torsion 33 is engageable with the motor by virtue of the rigid connection to end cap 32 and pulley 31. End cap 32 is equipped with a locking pin 73 extending therethrough and extending through the torsion bar 33. End cap 32 is fastened to pulley 31 by means of a machine screw 36. When the motor 34 drives the pulley 31 through the V-belt, it acts first upon the torsion bar 33 at end cap 32. This force is transmitted through the torsion bar to the hollow shaft 72 at the opposite end 38. In this way, the torsion bar 33 acts to dampen the acceleration and deceleration of rotation of the sprocket 51 mounted on shaft 72 when the motor 34 is started and stopped.

A plurality of push bars 52 are connected to the sprockets 51 by attachment to the endless chain 53. The two pairs of linked sprockets 51 which are provided are positioned in mutually parallel alignment on the axles 18 and 19. As can be seen in FIGS. 3 and 4, the separate push bars 52 engage separate ones of the discrete loads 13 to move the loads 13 toward the transfer means 25. When the powered cargo delivery means 14 is actuated, at least one of the push bars 52 engages a load 13 located on the queing platform 23 and moves that load along a lateral path intersecting the generally vertical path of the vertical conveyor 61. That is, with reference to FIGS. 3 and 4, the push bars 52 move the loads 13 in sequential order toward the conveyor tower 12.

The transfer means 25 is comrised of an L-shaped member 84 which is rotatable about an axle 40. The member 84 of the transfer mechanism 25 rotates about axle 40 between a cargo load acceptance position or mode, as indicated in FIG. 3, and a cargo delivery position or mode as indicated in dashed lines in FIG. 4. From the cargo load delivery mode, the member 84 returns to the load acceptance mode, as indicated in solid lines in FIG. 4. Upon returning to the cargo load acceptance position, the transfer means 25 is available to accept the next sequential load 13 which, through synchronization of operation of the transfer means 25 and the powered cargo delivery means 14, is immediately delivered to the transfer means 25.

Synchronizaton of operation is provided by the motor actuating switch 68 which has an electrical connection to motor 34 to transmit an actuating signal to motor to 34 under the control of the load transfer mechanism 25. As illustrated in FIG. 6, a toggle switch 67 in a the motor actuating switch 68 is equipped with a cam follower 73. An actuating cam 62 is secured about the axle 40 by means of a bracket 66 passing over the axle 40 and fastened to the cam 62 by means of machine bolts 63. The actuator arm 67 of the toggle switch 68 is biased into contact with the actuating cam 62. As the axle 40 turns in a clockwise direction upon actuation of the load transfer mechanism 25 moving from a load acceptance mode to a load transfer mode, the actuating cam 62 is turned in a clockwise direction. In the position indicated in solid lines in FIG. 6, the toggle switch 68 is in deactuated position. However, as the actuating cam 62 rotates in a clockwise direction, the actuator arm 67 is forced to the position indicated in dashed lines at 67' in FIG. 6. This closes a contact within the toggle switch 68 to produce an actuating signal to the motor 34. Adjustment of the synchronization of the operation of the motor 34 with the operation of the load transfer mechanism 25 is achieved by altering the position of the actuaing cam 62 with respective to the axle 40. This alternation is achieved by loosening the bolts 63 so that the actuating cam 62 can be repositioned clockwise or counterclockwise as desired. Since the cam follower 62 moves with the load transfer mechanism 25, it can be seen that the powered cargo delivery means 14 is actuated under the control of the load transfer mechanism 25.

The load transfer mechanism 25 is itself operated by a receptacle sensing means 71, which has a feeler 164 that extends into the path of the vertical conveyor system 61. As a receptacle 15 approaches the loading area of the vessel 10, a cross bar 17 associated with that receptacle 15 forces the feeler 164 of the receptacle sensing means out of the path of the conveyor system 61 and into an actuating position. This closes an electrical contact within the receptacle sensing means 71 to actuate a pneumatic cylinder (not visible) to move the transfer means 25 from the cargo load acceptance mode to the cargo load delivery mode as previously explained. The actuation of the transfer means 25 and its return to the cargo acceptance mode of operation occurs over a pre-set transfer interval from the moment of actuation of the transfer means 25 by the receptacle sensing means 71. The spacing of the push bars 52 along the chains 53 is coordinated with this pre-set transfer interval so that during the transfer interval when one load is being delivered to a receptacle, the next sequential cargo load is automatically moved from the position where it is received at the lateral platform 23 from a powered conveyor means 21 towards the transfer means 25 and arrives at the transfer means 25 as soon as the transfer means returns to the load acceptance mode.

A sensor switch 74 is connected to the superstructure 20 and is provided with a wand 75 extending into the path of the push bars 52 at a location proximate to the load transfer mechanism 25. As a push bar 52 forces a load 13 onto the load transfer mechanism 25, it rises with the rotation of the sprockets 51 to strike the wand 74. This provides a deactiviating signal to the motor 34 of the powered cargo delivery means 14, incident to the delivery of a cargo load 13 to the load transfer mechanism 25.

As previously indicated, the queing platform 23 is equipped with limit switches 35 in association with each of the powered lateral conveyors 21. The limit switches 35 are employed to provide enabling signals to the motor 34, whereby concurrence of an enabling signal from the limit switch 35 and an actuating signal from the motor actuating switch 68 is necessary in order to operate the motor 34 to drive the sprockets 51. The details of construction of the limit switch assembly 35 is indicated in FIG. 7. As can be seen, an angle section 69 is provided which is connected to the superstructure 20 is some convenient manner. Each limit switch assembly 35 includes a strike bar 44 located across the queing platform 23 some distance from and in the path of a powered lateral conveyor 21. A pivot axle 43 extends parallel to the strike bar 44. A protective cover 24 is attached to the angle section 69 to prevent the cargo loads 13 from striking the axle 43. One end of a pivot arm 45 is connected to the strike bar 44 and another end of the pivot arm terminates in a sleeve that fits around the axle 43 and is longitudinally secured in place. A limit adjustment screw 22 is threadably engaged through the pivot arm 45 to limit the extent of movement of the striker bar 44. The force of gravity resulting from the weight of the strike bar 44 and pivot arm 45 urges the strike bar 44 toward the associated lateral conveyor 21. An actuator bar 46 is rigidly connected to the strike bar 44 and extends transversely therefrom away from the associated lateral conveyor 21. The upper surface of the actuator bar 46 is cam surface.

A limit toggle switch 49 is rigidly attached to the angle section 69. The toggle switch 49 includes an actuator arm 48 that terminates in a cam rider 47 which follows in contact with the cam surface of the actuator bar 46. In its undeflected condition, the strike bar 44 is in the position indicated in solid lines in FIG. 7. Consequently, the cam rider 47 is biased against the cam surface of the actuator bar 46 and is in a disabled condition. When, however, a cargo load 13 is propelled across the queing platform 23, it deflects the strike bar 44 to the position indicated in dashed lines. This rotates the actuator bar 46 in a clockwise direction about the pivotal axle 43 to the position indicated in dashed lines at 46'. This urges the actuator arm 48 of the toggle switch 49 upward to the position 48', thereby closing a contact within the toggle switch 49 and causing it to transmit an enabling signal to the motor 34. This enabling signal must be present before the actuating signal from the motor actuating switch 68 will be effective to turn on the motor 34.

The lateral platform 23 is carried by a superstructure 20 which includes laterally extending releasable fasteners 39 that partially encircle the rails 76 of the upright stanchions 11. The fasteners 39 are slidably moveable lengthwise along the rails 76 and accommodate rotation of the platform 23 relative to the conveyor tower 12. The structure 20 is mounted upon a bed 29 which in turn is carried upon a support 77 that rides upon the deck of the vessel 10 on casters 30 and 65.

The powered lateral conveyors 21 include upright guides 78 that channel the cargo loads squarely onto the queing platform 23. The guides 78 thereby aid in straightening out any boxes or loads 13 that may be askew. The guides 78 may or may not be of a configuration which acts as a funnel to further assist in aligning the load 13 in the direction of travel on the conveyors 21. If this funnel configuration is desired, the funnel would open toward the expandable and retractable conveyor systems 41 which feed into the powered lateral conveyors 21. The conveyor systems 41 include scissors linkages which are connected both to powered conveyors 23 and to vessel 10. The accordion-like action of the scissors linkages accomodates rotational motion of the vessel 10 with respect to the tower 12 when the vessel 10 shifts at its moorings.

FIG. 8 illustrates an alternative embodiment of the invention. In this embodiment, a separate transfer means is not required, since the platform 23' is mounted on the superstructure 20, on the vessel 10, and sloped downward therefrom toward the endless conveyor means 61. As in the other embodiments, the platform 23' is transversely oriented with respect to the lateral conveyor means 21. The platform 23' is a ramp sloped at an angle with respect to the horizontal whereby the force of gravity is sufficient to overcome the force of friction of the load 13 on the platform 23'. Thus, once a load 13 is passively received on the platform 23', it slides toward an approaching receptacle 15.

The powered cargo delivery means 14 is synchronized with the endless conveyor means 61 by the receptacle sensing means 71. The feeler 164 extends into the path of the vertical conveyor system 61. As it is engaged by one of the bars 17, it activates the cargo delivery means 14 to rotate the sprocket 51. The sprocket 51 carries the push bar 52 against the load 13, thereby forcing the load from the lateral conveyor 21 onto the sloped platform 23' as illustrated. The load 13 then slides along the platform 23' and is carried by the forces of gravity and inertia into the approaching receptacle 15. The push bar 52 continues to be carried by the chain 53 until it strikes the wand 75 of the sensor switch 74. This halts the cargo delivery means 14 so that when subsequently actuating by the receptacle sensing means 71, the push bar 52 will begin its movement from a predetermined position. Synchronized movement is thereby effected between said vertical conveyor 61 and the powered cargo delivery means 14.

It is to be understood that numerous other variations and modifications of the invention will become apparent in view of the disclosure herein. The foregoing detailed descriptions and illustrative matter is therefore for purposes of explanation only, and no unnecessary limitations should be construed therefrom, as the invention is defined in the claims appended hereto. For example, the sprocket 51 need not be disk shaped with teeth at the peripheries thereof, but instead might employ a central hub having radial spokes extending therefrom. A cargo load would then be engaged by a single spoke and forced toward the tower 12 with subsequent cargo loads being engaged by subsequent spokes.

I claim:

1. In a cargo transport system for transferring discrete cargo loads from a vessel upon which is mounted a powered lateral conveyor means for directing movement of discrete cargo loads along a path terminating at a loading station on said vessel to a conveyor tower extending vertically from a cargo terminal to the aforesaid loading station and carrying thereon an endless conveyor means formed with discrete receptacles traversing the length of said tower, so that each of said receptacles sequentially approaches the loading station to receive a cargo load therefrom; the improvement wherein there is provided at said loading station;

a lateral platform mounted on said vessel for passively receiving discrete cargo loads from said powered lateral conveyor means;

transfer means positioned between said tower and said platform for sequentially accepting said cargo loads from said platform and for transferring an accepted cargo load to a receptacle arriving at said loading station upon actuation over a pre-set transfer interval;

powered cargo delivery means for forcing cargo loads received on said platform from said lateral conveyor means to said transfer means during said pre-set transfer interval;

and receptacle sensing means for detecting an approaching receptacle and for actuating said transfer means to effect the transfer of a cargo load from said lateral conveyor means to said approaching receptacle, and means for actuating said powered cargo delivery means to effect delivery of a sequential load to said transfer means as aforesaid after the elapse of a pre-set transfer interval from the moment of actuation of said transfer means, whereby said cargo loads are automatically moved from said lateral conveyor across said lateral platform to be sequentially loaded in said receptacles 2. The improved cargo transport system of claim 1 wherein said powered cargo delivery means is comprised of at least one flat circular member responsive to actuation of said receptacle sensing means for rotation about its own generally horizontal axis, and at least one push bar perpendicular to and joined to said flat circular member and perpendicular to and intersecting a path leading from said loading station to said transfer means, whereby said push bars separately engage different ones of said discrete loads received at said lateral platform from said lateral conveyor means and separately force said loads across said platform to sequentially deliver said loads to said transfer means.

3. The improved cargo transport system of claim 2 wherein said powered cargo delivery means is comprised of two mutually parallel pairs of two each of said flat circular members in the form of driving and driven sprockets, and both of the driving sprockets are rotatable about one axis and both driven sprockets are rotatable about another axis, and the sprockets in each pair are connected to each other by a separate endless chain upon each of which mounted a plurality of push bars as aforesaid, whereby push bars of each chain engage separate ones of said discrete loads.

4. An improved cargo transport system for use in transferring a multiplicity of separate and discrete loads to a cargo terminal from a loading area of a vessel vertically displaced there from comprising:

a vertically extending support secured to said cargo terminal having an endless conveyor system with separate receptacles therein, traveling the length thereof, whereby each of said receptacles approaches the loading area of said vessel along a generally vertical path in seriatim order;

a powered lateral conveyor means mounted on said vessel to carry discrete loads along a generally horizontal path to said loading area;

a queing platform located at said loading area for receiving loads from said lateral conveyor means;

a load transfer mechanism cyclically operable to switch from a load acceptance mode to a load transfer mode and to return to said load acceptance mode for individually accepting said separate loads from said queing platform while in a load acceptance mode and for individually transferring said loads to said receptacle during operation in said load transfer mode to effectuate transpositioning of said separate loads between said horizontal path and said generally vertical path;

a powered cargo delivery means for propelling said cargo loads individually across said platform to said load transfer mechanism; and receptacle sensing means for detecting the approach of a receptacle toward said loading area of said vessel and connected to switch said load transfer mechanism from said load acceptance mode to said load transfer mode to transfer a load deposited thereon to said approaching receptacle; and means for actuating the powered cargo delivery means to move another load from said queing platform onto said load transfer mechanism upon return of said load transfer mechanism to said load acceptance mode.

5. The improved cargo transport system of claim 4 wherein said powered cargo delivery means is comprised of at least one disc mounted for rotation above said queing platform in a plane generally perpendicular to said queing platform and parallel to a path that intersects the aforesaid generally vertical path, and at least one push bar is connected to said disc to extend in a direction perpendicular thereto, and wherein said disc is driven in rotation about its own axis and actuated to carry said push bar to engage a load located on said queing platform and move said load along a lateral path intersecting the aforesaid generally vertical path.

6. The improved cargo transport system of claim 5 wherein at least two discs as aforesaid are provided in the form of driving and driven sprockets aligned in a common plane, and said sprockets are linked together by an endless chain, and a plurality of push bars are connected to sprockets by attachment to said endless chain.

7. The improved cargo transport system of claim 6 wherein two mutually parallel pairs of linked sprockets are provided, each pair having common push bars connected thereto.

8. The improved cargo transport system of claim 7 wherein one of said pairs of linked sprockets is a driving pair and further comprising a motor assembly for driving said driving pair of sprockets, and wherein both driving sprockets in said driving pair are secured to a common, hollow shaft, proximate to the center thereof and a torsion bar extends through said shaft and is connected thereto and is engageable with said motor proximate to an end thereof, whereby said torsion bar acts to dampen the acceleration and deceleration of the rotation of said sprockets when said motor is started and stopped.

9. The improved cargo transport system of claim 5 wherein said powered cargo delivery means further comprises a motor assembly for driving said disk and wherein said means for actuating said powered cargo delivery means comprises a motor actuating switch connected to transmit an actuating signal to said motor assembly under the control of said load transfer mechanism to transmit such an actuating signal when said load transfer mechanism changes mode of operation, whereby said powered cargo delivery means is actuated under the control of said load transfer mechanism.

10. The cargo transport system of claim 9 wherein said queing platform is equipped with limit switch means to provide enabling signals to said motor assembly, whereby concurrence of an enabling signal from said limit switch means and an actuating signal from said motor actuating switch is necessary to operate said motor assembly to drive said disk.

11. The cargo transport system of claim 10 wherein said limit switch means includes a strike bar located across said queing platform in the path of each powered lateral conveyor, a pivot axle secured with respect to said queing platform, a pivot arm connected to said strike bar and to said pivot axle to urge said strike bar toward the associated lateral conveyor, an actuator bar having a cam surface and secured to said strike bar and extending transversely therefrom away from said associated lateral conveyor and a toggle switch having an actuator arm terminating in a cam rider that follows in contact with said cam surface of said activator bar and biased in a disabling direction, whereby said toggle switch transmits an enabling signal to said motor assembly when said lateral conveyor means propels one of said discrete loads across said queing platform to deflect said strike bar.

12. The improved cargo transport system of claim 9 wherein said load transfer mechanism rotates about an axle in its cylindrical operation, and an actuating cam is secured to the same axle, and said motor actuating switch is a toggle switch having an actuator arm terminating in cam follower that is biased into contact with said actuating cam.

13. The improved cargo transport system of claim 9 wherein a sensor switch is provided with a wand extending into the path of said push bar at a location proximate to said load transfer mechanism, whereby said push bar strikes said wand to deactivate said powered cargo delivery means incident to the delivery of a cargo load to said load transfer mechanism by said powered cargo delivery means.

14. A cargo transport system of claim 4 wherein said powered lateral conveyor means includes a plurality of powered conveyor belts for feeding said loads onto said queing platform and limit stops are provided in association with said queing platform to limit the extent of travel of said loads from said powered conveyor belts in a generally horizontal direction that intersects the direction in which said loads are propelled across said platform.

15. In a cargo transport system for transferring discrete cargo loads from a vessel upon which is mounted a lateral conveyor means for directing movement of discrete cargo loads along a path terminating at a loading station on said vessel to a conveyor tower extending vertically from a cargo terminal to the aforesaid loading station and carrying thereon an endless conveyor means formed with discrete receptacles transversing the length of said tower, so that each of said receptacles sequentially approaches the loading station to receive a cargo load therefrom; the improvement wherein there is provided at said loading station;
a platform transversely oriented with respect to said lateral conveyor means and mounted on said vessel and sloped downward therefrom toward said endless conveyor means for sequentially and passively receiving discrete cargo loads from said lateral conveyor means, and for allowing loads so received to slide toward an approaching receptacle;
powered cargo delivery means for forcing cargo loads onto said sloped platform from said lateral conveyor means;
receptacle sensing means for detecting an approaching receptacle in said endless conveyor means for actuating said powered cargo delivery means to effect delivery of a sequential load onto said platform means as aforesaid whereby said cargo load slides from said platform into said approaching receptacle.

16. The improved cargo transport system of claim 15 wherein said platform is a ramp sloped at an angle with respect to the horizontal, whereby the force of gravity is sufficient to overcome the force of friction of said load on said platform.

\* \* \* \* \*